(12) United States Patent
Chen et al.

(10) Patent No.: US 12,307,631 B2
(45) Date of Patent: May 20, 2025

(54) SUPER-RESOLUTION IMAGE RECONSTRUCTION METHOD AND SUPER-RESOLUTION IMAGE RECONSTRUCTION SYSTEM CAPABLE OF DYNAMICALLY ADJUSTING WEIGHTINGS ACCORDING TO TEMPORAL INFORMATION

(71) Applicant: WELTREND SEMICONDUCTOR INC., Hsinchu (TW)

(72) Inventors: Hsuan-Ying Chen, Hsinchu (TW); Chien-Ming Chen, Hsinchu (TW); Te-Wei Hsu, Hsinchu (TW)

(73) Assignee: WELTREND SEMICONDUCTOR INC., Hsinchu (TW)

( * ) Notice: Subject to any disclaimer, the term of this patent is extended or adjusted under 35 U.S.C. 154(b) by 387 days.

(21) Appl. No.: 17/888,514

(22) Filed: Aug. 16, 2022

(65) Prior Publication Data

US 2023/0316461 A1 Oct. 5, 2023

(30) Foreign Application Priority Data

Apr. 1, 2022 (TW) .................................. 111112857

(51) Int. Cl.
*G06T 3/4053* (2024.01)
*G06T 5/50* (2006.01)

(52) U.S. Cl.
CPC .............. *G06T 3/4053* (2013.01); *G06T 5/50* (2013.01); *G06T 2207/20212* (2013.01)

(58) Field of Classification Search
None
See application file for complete search history.

(56) References Cited

U.S. PATENT DOCUMENTS

| 9,307,148 B1 * | 4/2016 | Baldwin | ............. H04N 23/683 |
| 2016/0301870 A1 * | 10/2016 | Matsuoka | ............ H04N 23/698 |
| 2018/0316865 A1 * | 11/2018 | Wakamatsu | ....... H04N 23/6812 |

FOREIGN PATENT DOCUMENTS

| CN | 102651122 A | * | 8/2012 | .......... G06T 3/4053 |
| CN | 106489169 A | * | 3/2017 | .......... G06T 3/4053 |
| CN | 111292354 A | * | 6/2020 | ............ G06T 7/246 |
| CN | 112184575 A | * | 1/2021 | ........... G06F 18/214 |
| JP | 2010034964 A | * | 2/2010 | .......... G06T 3/4069 |
| JP | 2019207611 A | * | 12/2019 | .......... G06T 3/4053 |
| JP | 2023094234 A | * | 7/2023 | |

* cited by examiner

*Primary Examiner* — Jiangeng Sun
(74) *Attorney, Agent, or Firm* — Winston Hsu

(57) ABSTRACT

A super-resolution image reconstruction method includes acquiring a plurality of raw images, positioning the plurality of raw images, acquiring a plurality of motion vectors, setting image coordinates of a super-resolution image, adjusting image coordinates of the super-resolution image according to the plurality of motion vectors for generating a plurality of updated image coordinates, setting a first image range, adjusting coordinates of a first image range according to the plurality of motion vectors for generating a plurality of updated first image ranges, generating a plurality of second image ranges according to each updated first image range, and generating a reconstructed pixel of the super-resolution image at the image coordinates according to a plurality of weightings, the plurality of updated first image ranges, and the plurality of second image ranges.

18 Claims, 6 Drawing Sheets

SUPER-RESOLUTION IMAGE RECONSTRUCTION METHOD AND SUPER-RESOLUTION IMAGE RECONSTRUCTION SYSTEM CAPABLE OF DYNAMICALLY ADJUSTING WEIGHTINGS ACCORDING TO TEMPORAL INFORMATION

BACKGROUND OF THE INVENTION

1. Field of the Invention

The present invention relates to a super-resolution image reconstruction method and a super-resolution image reconstruction system, and more particularly, a super-resolution image reconstruction method and a super-resolution image reconstruction system capable of dynamically adjusting weightings according to temporal information.

2. Description of the Prior Art

With advancements of technologies, various barcodes are gradually adopted in our daily life. Actually, complicated and error-prone text messages are gradually being replaced with the barcodes. Particularly, the barcode can be regarded as an image pattern recognition element set in form of several black bars and white spaces with different widths according to a certain coding rule (i.e., ratios of black and white widths) for bearing some useful information. A common barcode is formed by an image pattern including parallel black bars and white spaces for achieving high reflectivity. The barcode can indicate a country which manufactures a product, a manufacturer of the product, a name of the product, a date the product being manufactured, a classification number of a book, starting and ending locations, any type of messages, or a certain date. Thus, barcodes are available in many fields of applications such as a commodity circulation, a library management, a postal management, and a banking system.

In general, when the barcode is ready to be identified, an image including finder patterns of the barcode is required. Further, the accuracy of identifying the barcode depends on the clarity of the image. Currently, technologies of generating a high-resolution image by synthesizing a plurality of images are popularly adopted. However, when a camera lens acquires the plurality of images, objects of the plurality of images are prone to be shaken. For example, the objects can be shaken due to unstable hands or object offsets. Therefore, when the high-resolution image is generated by synthesizing the plurality of images, the image quality may be unexpectedly decreased. Thus, high computational complexity and unexpectedly low image quality of processed images are two major drawbacks of current high-resolution image technologies.

SUMMARY OF THE INVENTION

In an embodiment of the present invention, a super-resolution image reconstruction method is disclosed. The super-resolution image reconstruction method comprises acquiring a plurality of raw images, positioning the plurality of raw images, acquiring a plurality of motion vectors after positioning the plurality of raw images, setting image coordinates of a super-resolution image, adjusting the image coordinates of the super-resolution image according to the plurality of motion vectors for generating a plurality of updated image coordinates, setting a first image range, adjusting coordinates of the first image range according to the plurality of motion vectors for generating a plurality of updated first image ranges, generating a plurality of second image ranges according to each updated first image range of the plurality of updated first image ranges, generating a reconstructed pixel of the super-resolution image at the image coordinates by linearly combining a plurality of pixels corresponding to the plurality of updated first image ranges according to a plurality of weightings, the plurality of updated first image ranges, and the plurality of second image ranges, and generating all reconstructed pixels of the super-resolution image for outputting the super-resolution image. When a resolution of the first image range is N×M, the first image range corresponds to N×M second image ranges. N and M are two positive integers.

In an embodiment of the present invention, a super-resolution image reconstruction system comprises an image capturing device, a memory, an output device, and a processor. The image capturing device is configured to acquire a plurality of raw images. The memory is configured to save data. The output device is configured to output a super-resolution image. The processor is coupled to the image capturing device, the memory, and the output device and configured to control the image capturing device, the memory, and the output device. The image capturing device acquires the plurality of raw images. The processor acquires a plurality of motion vectors after positioning the plurality of raw images. The processor sets image coordinates of the super-resolution image. The processor adjusts the image coordinates of the super-resolution image according to the plurality of motion vectors for generating a plurality of updated image coordinates. The processor sets a first image range. The processor adjusts coordinates of the first image range according to the plurality of motion vectors for generating a plurality of updated first image ranges. The processor generates a plurality of second image ranges according to each updated first image range of the plurality of updated first image ranges. The processor generates a reconstructed pixel of the super-resolution image at the image coordinates by linearly combining a plurality of pixels corresponding to the plurality of updated first image ranges according to a plurality of weightings, the plurality of updated first image ranges, and the plurality of second image ranges. The processor generates all reconstructed pixels of the super-resolution image. The processor controls the output device for outputting the super-resolution image. When a resolution of the first image range is N×M, the first image range corresponds to N×M second image ranges. N and M are two positive integers.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
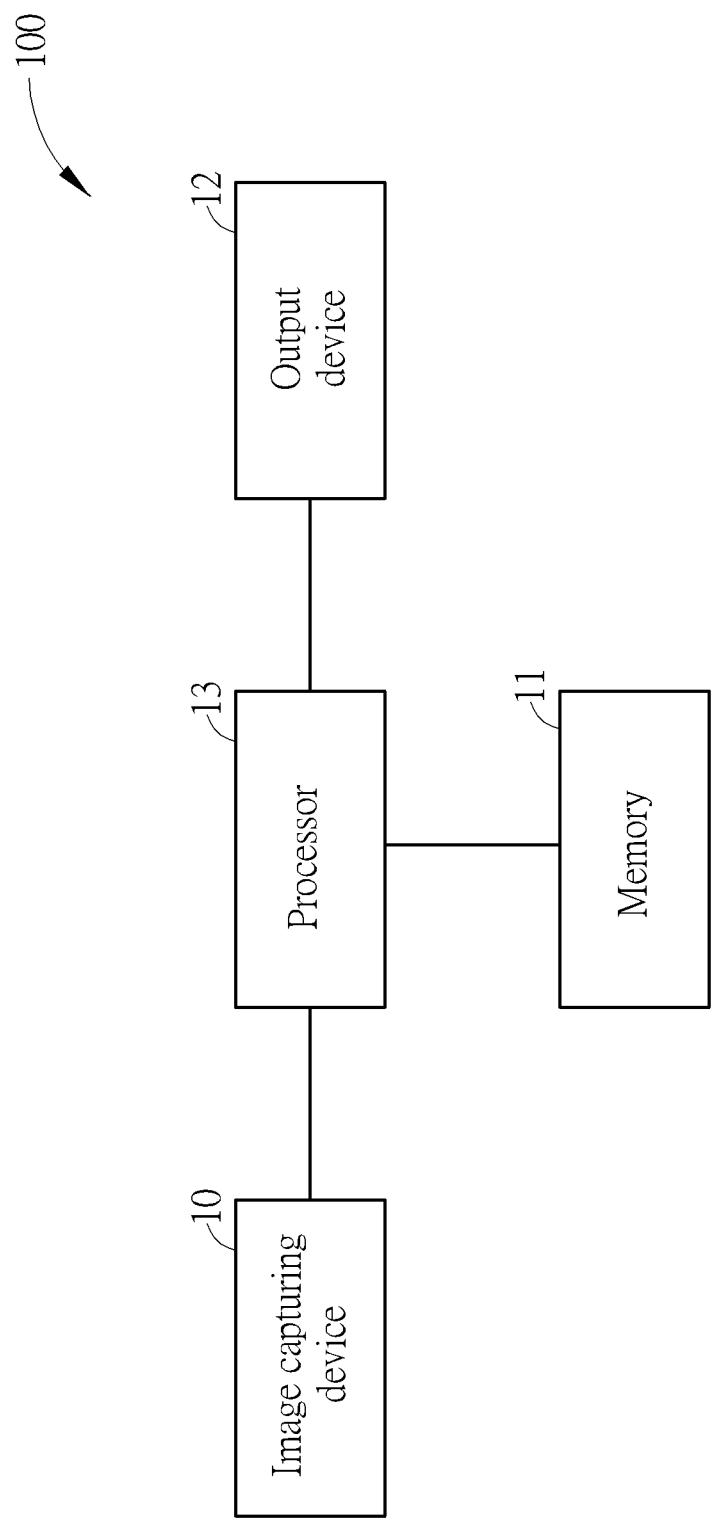
FIG. 1 is a block diagram of a super-resolution image reconstruction system according to an embodiment of the present invention.

FIG. 1 is a block diagram of a super-resolution image reconstruction system 100 according to an embodiment of the present invention. The super-resolution image reconstruction system 100 can combine a plurality of images on a temporal axis or a spatial axis for generating a super-resolution image. Thus, the super-resolution image reconstruction system 100 can also be applied to enhance a resolution of a barcode image. Hereafter, the super-resolution image reconstruction system 100 is illustrated for enhancing the barcode image. The super-resolution image reconstruction system 100 includes an image capturing device 10, a memory 11, an output device 12, and a processor 13. The image capturing device 10 can be any camera lens or video recorder for acquiring a plurality of raw images. The memory 11 is used for saving data. The output device 12 is used for outputting the super-resolution image. The output device 12 can be a screen, an image output port, or a projection system. The processor 13 is coupled to the image capturing device 10, the memory 11, and the output device 12 for controlling the image capturing device 10, the memory 11, and the output device 12. The super-resolution image reconstruction system 100 can use temporal information of the image in conjunction with a dynamic positioning technology for accurately synthesizing the plurality of raw images to generate a super-resolution image with satisfactory image quality. Further, the super-resolution image reconstruction system 100 can dynamically position and synthesize the plurality of raw images without high computational complexity. Details of the super-resolution image reconstruction system 100 are illustrated below.

In the super-resolution image reconstruction system 100, the image capturing device 10 acquires the plurality of raw images. Then, the processor 13 acquires a plurality of motion vectors after positioning the plurality of raw images. Particularly, in the super-resolution image reconstruction system 100, the plurality of raw images can be generated by continuously capturing images of an object by the image capturing device 10 over time. The plurality of raw images can also be generated by capturing images of the object by a plurality of image capturing devices. Any reasonable technology modification falls into the scope of the present invention. Then, the processor 13 can set image coordinates of the super-resolution image. Further, the image coordinates of the super-resolution image can be regarded as coordinates of a reconstructed pixel of the super-resolution image by the processor 13 according to the plurality of raw images, denoted as two-dimensional coordinates (x, y). Then, the processor 13 can adjust the image coordinates of the super-resolution image according to the plurality of motion vectors for generating a plurality of updated image coordinates. Details of generating the plurality of updated image coordinates are illustrated later. Then, the processor 13 sets a first image range. The first image range is smaller than a range of the super-resolution image. The first image range can be called as a "Neighborhood Range". The processor 13 can adjust coordinates of the first image range according to the plurality of motion vectors for generating a plurality of updated first image ranges. Then, the processor 13 can generate a plurality of second image ranges according to each updated first image range of the plurality of updated first image ranges. The second image range can be called as a "Patch Range". When a resolution of the first image range is N×M, the first image range corresponds to N×M second image ranges. N and M are two positive integers. The processor 13 can generate a reconstructed pixel of the super-resolution image at the image coordinates (x, y) by linearly combining a plurality of pixels corresponding to the plurality of updated first image ranges according to a plurality of weightings, the plurality of updated first image ranges, and the plurality of second image ranges. Then, the processor 13 can generate all reconstructed pixels of the super-resolution image. Finally, the processor 13 can control the output device 12 for outputting the super-resolution image. In the super-resolution image reconstruction system 100, details of generating the super-resolution image by processing the plurality of raw images are illustrated later.

Figure 2:
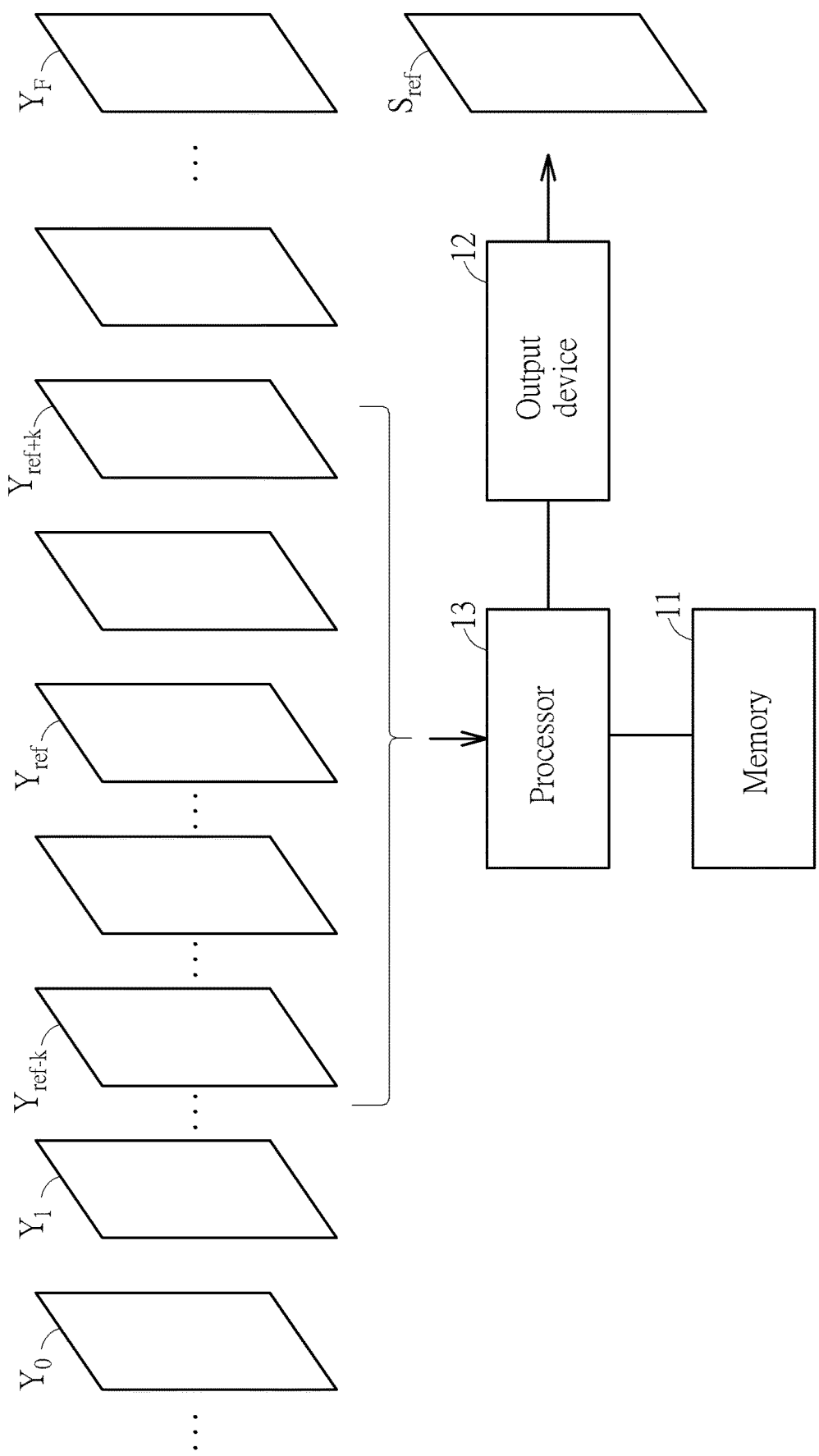
FIG. 2 is an illustration of processing a plurality of raw images by a processor and outputting a super-resolution image by an output device of the super-resolution image reconstruction system in FIG. 1.

FIG. 2 is an illustration of processing a plurality of raw images by the processor 13 and outputting the super-resolution image by the output device 12 of the super-resolution image reconstruction system 100. In FIG. 2, the plurality of raw images $Y_0$ to $Y_F$ can be generated by continuously capturing images of an object by the image capturing device 10 over time. Alternatively, the plurality of raw images $Y_0$ to $Y_F$ can be generated by a plurality of image capturing devices. F is a positive integer. For example, the image capturing device 10 can be a video recorder. The image capturing device 10 can record images at a rate of 30 frames per second (30 fps). Therefore, after one second, the image capturing device 10 can capture 30 raw images (F=29). For generality, the processor 13 can sample the raw image $Y_{ref-k}$ to the raw image $Y_{ref+k}$ according to a center position raw image $Y_{ref}$, thereby sampling a total of (2k+1) raw images. The (2k+1) raw images can be used for generating the super-resolution image $S_{ref}$ by the processor 13. Specifically, the time index ref can be moved over time. Therefore, a position of the sampling sliding window (i.e., 2k+1 sampling size) can be moved over time. As a result, the super-resolution image $S_{ref}$ can be regenerated (or say, updated) over time. In other words, the super-resolution image reconstruction system 100 can be regarded as a system that can continuously generate the super-resolution image $S_{ref}$ over time. The super-resolution image $S_{ref}$ can be updated in real-time.

Figure 3:
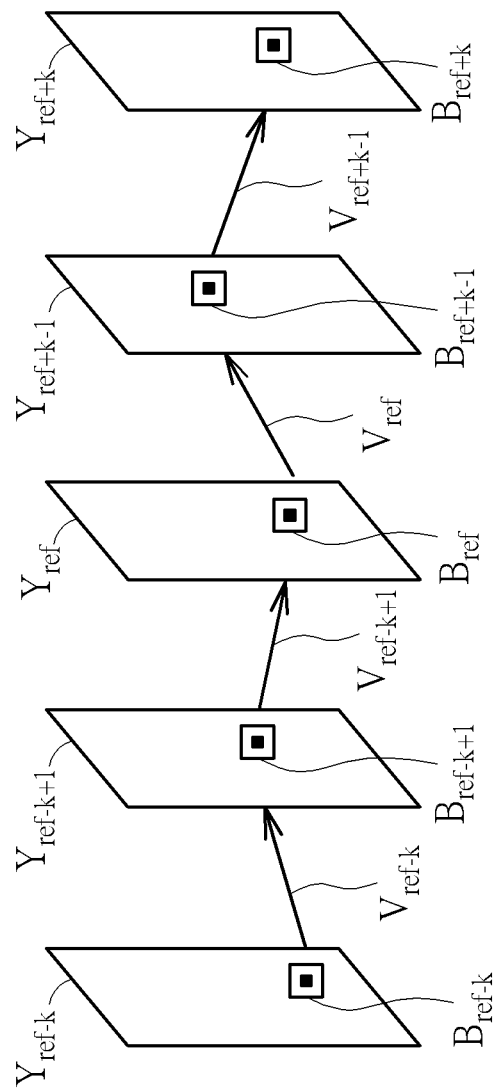
FIG. 3 is an illustration of generating a plurality of motion vectors according to finder patterns of barcodes in the plurality of raw images of the super-resolution image reconstruction system in FIG. 1.

FIG. 3 is an illustration of generating a plurality of motion vectors $V_{ref-k}$ to $V_{ref-k+1}$ according to finder patterns of barcodes in the plurality of raw images $Y_{ref-k}$ to $Y_{ref+k}$ of the super-resolution image reconstruction system 100. As previously mentioned, the super-resolution image reconstruction system 100 can be applied to enhance the resolution of the barcode images. In FIG. 3, the plurality of raw images $Y_{ref-k}$ to $Y_{ref+k}$ includes finder patterns $B_{ref-k}$ to $B_{ref+k}$ of the barcode images. The processor 13 can position finder patterns $B_{ref-k}$ to $B_{ref+k}$ of the barcode images according to the plurality of raw images $Y_{ref-k}$ to $Y_{ref+k}$. For example, the processor 13 can acquire coordinates of reference points corresponding to finder patterns $B_{ref-k}$ to $B_{ref+k}$ of the barcode images according to the plurality of raw images $Y_{ref-k}$ to $Y_{ref+k}$. In other words, position offsets of the raw images $Y_{ref-k}$ to $Y_{ref+k}$ over time can be detected by the processor 13. Then, the processor 13 can quantize the position offsets of the raw images $Y_{ref-k}$ to $Y_{ref+k}$. For example, after a finder pattern $B_{ref-k}$ of the raw image $Y_{ref-k}$ and a finder pattern $B_{ref-k}+_1$ of the raw image $Y_{ref-k+1}$ are positioned by the processor 13, a motion vector $V_{ref-k}$ can be generated accordingly. After a finder pattern $B_{ref-k+1}$ of the raw image $Y_{ref-k}+1$ and a finder pattern $B_{ref}$ of the raw image $Y_{ref}$ are positioned by the processor 13, a motion vector $V_{ref-k+1}$ can be generated accordingly. After a finder pattern $B_{ref}$ of the raw image $Y_{ref}$ and a finder pattern $B_{ref+k-1}$ of the raw image $Y_{ref+k-1}$ are positioned by the processor 13, a motion vector $V_{ref}$ can be generated accordingly. After a finder pattern $B_{ref+k-1}$ of the raw image $Y_{ref+k-1}$ and a finder pattern $B_{ref+k}$ of the raw image $Y_{ref+k}$ are positioned by the processor 13, a motion vector $V_{ref+k-1}$ can be generated accordingly.

Figure 4:
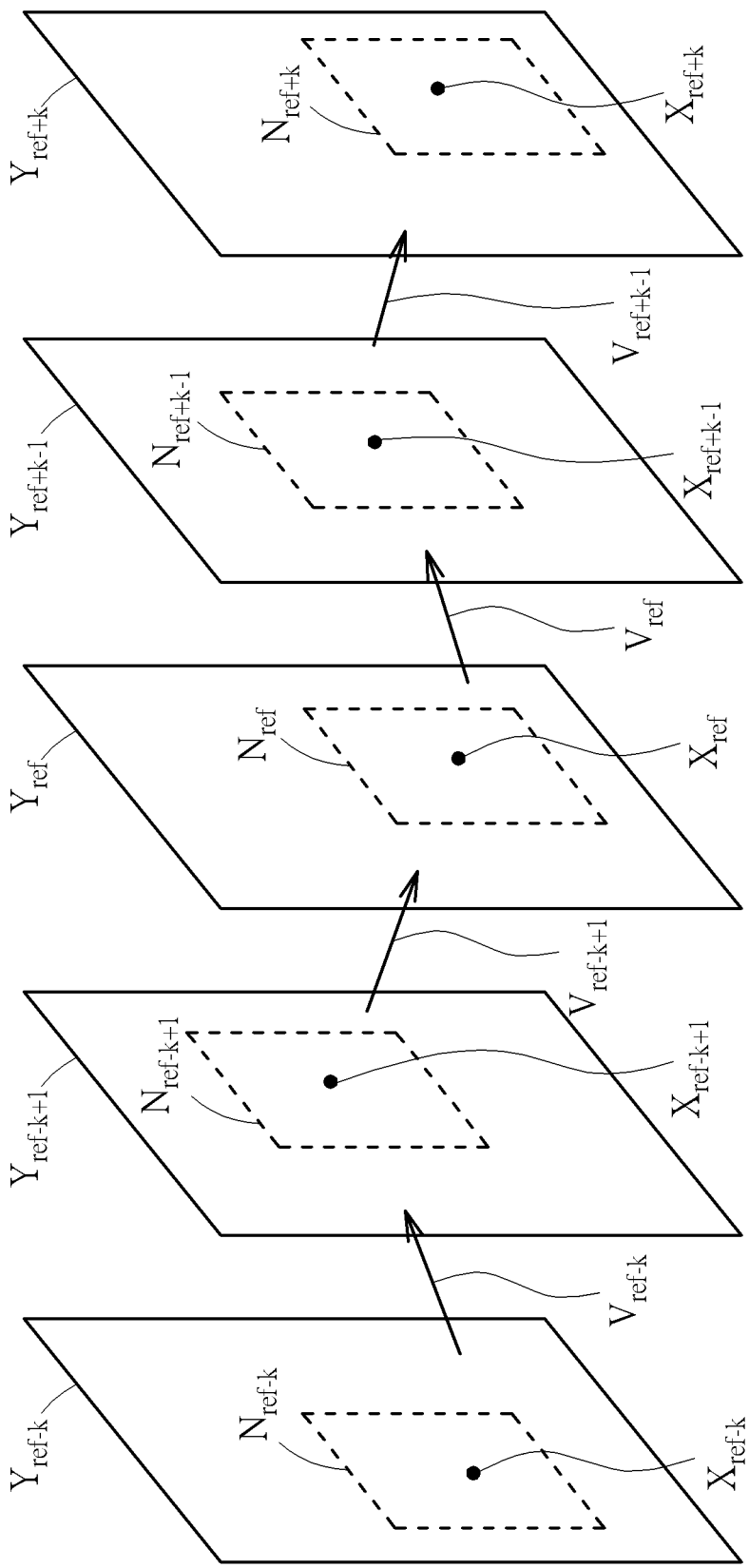
FIG. 4 is an illustration of updating image coordinates and a first image range according to the plurality of motion vectors of the super-resolution image reconstruction system in FIG. 1.

FIG. 4 is an illustration of updating image coordinates and a first image range according to the plurality of motion vectors $V_{ref-k}$ to $V_{ref+k-1}$ of the super-resolution image reconstruction system 100. As previously mentioned, the image coordinates (x, y) of the super-resolution image can be regarded as coordinates of a reconstructed pixel of the super-resolution image by the processor 13 according to the plurality of raw images $Y_{ref-k}$ to $Y_{ref+k}$. The plurality of raw images $Y_{ref-k}$ to $Y_{ref+k}$ can be shaken due to unstable hands or object offsets, leading to coordinates offsets. However, since the motion vectors $V_{ref-k}$ to $V_{ref+k-1}$ can be acquired, the processor 13 can update the image coordinates (x, y) according to position offsets of the motion vectors $V_{ref-k}$ to $V_{ref+k-1}$. For example, after image coordinates of an image point $X_{ref-k}$ are shifted, the image coordinates of the image point $X_{ref-k}$ can be updated to the image coordinates of the image point $X_{ref-k}+_4$ according to the motion vector $V_{ref-k}$. After the image coordinates of the image point $X_{ref-k}+_1$ are shifted, the image coordinates of the image point $X_{ref-k}+1$ can be updated to the image coordinates of the image point $X_{ref}$ according to the motion vector $V_{ref-k+1}$. After the image coordinates of the image point $X_{ref}$ are shifted, the image coordinates of the image point $X_{ref}$ can be updated to the image coordinates of the image point $X_{ref+k-1}$ according to the motion vector $V_{ref}$. After the image coordinates of the image point $X_{ref+k-1}$ are shifted, the image coordinates of the image point $X_{ref+k-1}$ can be updated to the image coordinates of the image point $X_{ref+k}$ according to the motion vector $V_{ref+k-1}$. Further, the processor 13 can use the motion vectors $V_{ref-k}$ to $V_{ref+k-1}$ for updating the first image range (i.e., the Neighborhood Range). For example, a first image range $N_{ref-k}$ of the raw image $Y_{ref-k}$ can be determined according to the image coordinates of the image point $X_{ref-k}$. A center point of the first image range $N_{ref-k}$ is the image point $X_{ref-k}$. A first image range $N_{ref-k+1}$ of the raw image $Y_{ref-k}+1$ can be determined according to the image coordinates of the image point $X_{ref-k+1}$. A center point of the first image range $N_{ref-k+1}$ is the image point $X_{ref-k+1}$. A first image range $N_{ref}$ of the raw image $Y_{ref}$ can be determined according to the image coordinates of the image point $X_{ref}$. A center point of the first image range $N_{ref}$ is the image point $X_{ref}$. A first image range $N_{ref+k-1}$ of the raw image $Y_{ref+k-1}$ can be determined according to the image coordinates of the image point $X_{ref+k-1}$. A center point of the first image range $N_{ref+k-1}$ is the image point $X_{ref+k-1}$. A first image range $N_{ref+k}$ of the raw image $Y_{ref+k}$ can be determined according to the image coordinates of the image point $X_{ref+k}$. A center point of the first image range $N_{ref+k}$ is the image point $X_{ref+k}$. In other words, the image coordinates of the super-resolution image are coordinates of a center point of the first image range. Further, the plurality of updated image coordinates correspond to coordinates of updated center points of the updated first image ranges.

In the super-resolution image reconstruction system 100, when the plurality of motion vectors are zero vectors, it implies that no offset is introduced to the raw images $Y_{ref-k}$ to $Y_{ref+k}$. Therefore, the plurality of updated image coordinates (i.e., coordinates of the image point $X_{ref-k+1}$ to the image point $X_{ref+k}$) are the image coordinates (x, y) of the super-resolution image. Therefore, the plurality of updated first image ranges are the first image range. For example, in FIG. 4, when the motion vectors $V_{ref-k}$ to $V_{ref+k-1}$ are zero vectors, the coordinates of the image point $X_{ref-k}$, the coordinates of the image point $X_{ref-k}+1$, the coordinates of the image point $X_{ref}$, the coordinates of the image point $X_{ref+k-1}$, and the coordinates of the image point $X_{ref+k}$ are identical. Further, a position of the first image range $N_{ref-k}$, a position of the first image range $N_{ref-k+1}$, a position of the first image range $N_{ref}$, a position of the first image range $N_{ref+k-1}$, and a position of the first image range $N_{ref+k}$ are identical. Further, after the first image ranges of the plurality of raw images $Y_{ref-k}$ to $Y_{ref+k}$ are determined, the second image ranges can be determined according to the first image ranges. Details are illustrated below.

Figure 5:
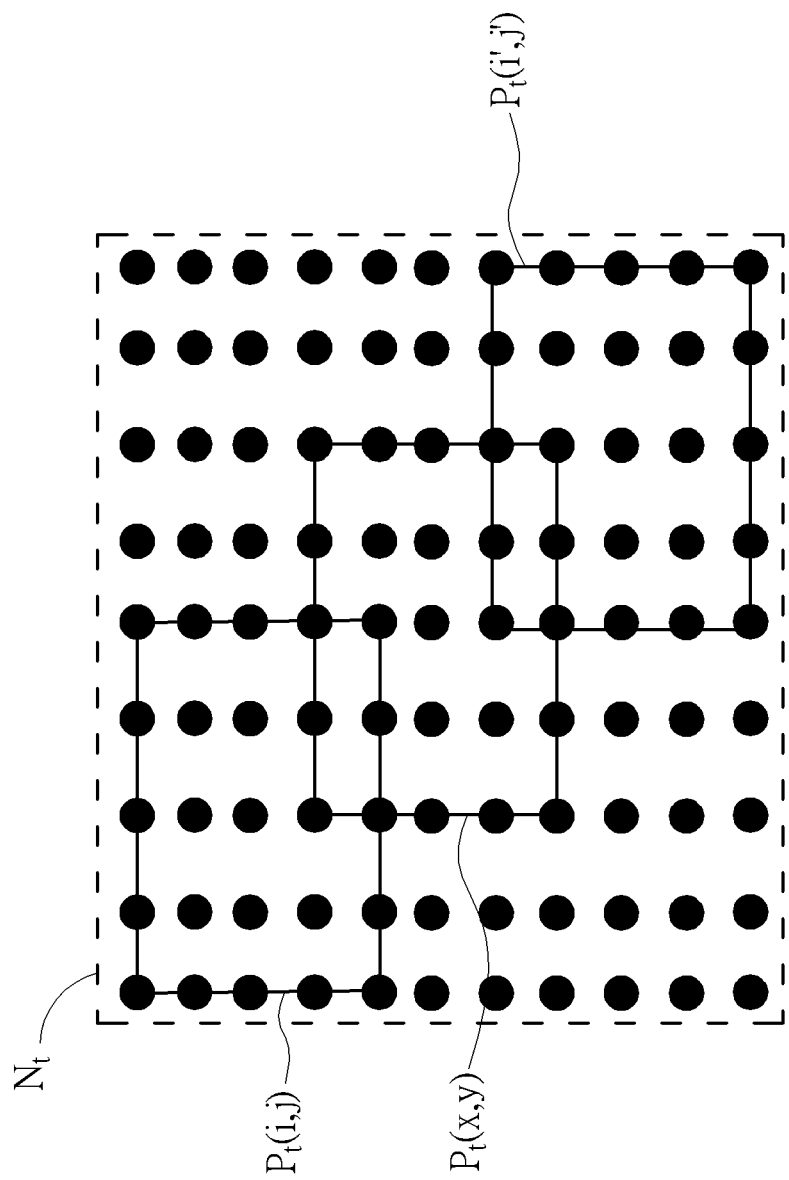
FIG. 5 is an illustration of a plurality of second image ranges corresponding to a first image range of the super-resolution image reconstruction system in FIG. 1.

FIG. 5 is an illustration of a plurality of second image ranges corresponding to a first image range $N_t$ of the super-resolution image reconstruction system 100. By definition, the first image range $N_t$ is denoted as a first image range of the raw image $Y_t$ at a time index t. The first image range $N_t$ and the plurality of second image ranges can be rectangles. Further, as previously mentioned, the super-resolution image reconstruction system 100 can be applied to reconstruct the super-resolution image of the barcode. Thus, a size of the first image range $N_t$ and sizes of the plurality of second image ranges can be determined by a version of the barcode image, the at least one finder pattern of the barcode image, and/or a comparison result of a barcode pattern with a look-up table or a formula. In FIG. 5, the processor 13 can set a size of the second image range. Further, the processor 13 can generate N×M second image ranges to meet the size according to coordinates of N×M pixels of the first image range $N_t$. Note that the first image range $N_t$ can be updated over time. For example, for the pixel with coordinates (i, j) in the first image range $N_t$, the processor 13 can generate a corresponding second image range $P_t(i,j)$. For the pixel with coordinates (i', j') in the first image range $N_t$, the processor 13 can generate a corresponding second image range $P_t(i', j')$. The two second image ranges may have partially overlapping pixels. Further, a center of each second image range of the N×M second image ranges corresponds to coordinates of each pixel of the N×M pixel of the first image range $N_t$. Therefore, for 2k+1 raw images $Y_{ref-k}$ to $Y_{ref+k}$, 2k+1 first image ranges $N_{ref-k}$ to $N_{ref+k}$ are introduced. Each first image range correspond N×M second image ranges. In other words, when the number of the plurality of raw images $Y_{ref-k}$ to $Y_{ref+k}$ is P (i.e., P=2k+1) and the number of the second image ranges corresponding to the each first image range is N×M, the reconstructed pixel of the super-resolution image at the image coordinates (x, y) is relevant to weightings corresponding to P×N×M second image ranges. Details are illustrated later.

In the super-resolution image reconstruction system 100, the reconstructed pixel $S_{ref}(x, y)$ at the image coordinates (x, y) can be written as $$S_{ref}(x, y) = \frac{\sum_{t \in [ref-k, \ldots, ref+k]} \sum_{(i,j) \in N_t(x,y)} w_t(i, j) \times Y_t(i, j)}{\sum_{t \in [ref-k, \ldots, ref+k]} \sum_{(i,j) \in N_t(x,y)} w_t(i, j)} \quad (1)$$

The image coordinates of the reconstructed pixel $S_{ref}(x, y)$ are denoted as $(x, y)$. t is a time index. $N_t(x, y)$ is denoted as a first image range having a center coordinate $(x, y)$ on a time index t. $(i,j) \in N_t(x,y)$ is denoted as a pixel coordinate set of the first image range having a center coordinate $(x, y)$ on the time index t. $w_t(i,j)$ is denoted as a weighting corresponding to pixel coordinates $(i, j)$ on the time index t. $Y_t(i, j)$ is denoted as a value of $(i, j)^{th}$ pixel of a raw image on the time index t. In equation (1), the reconstructed pixel $S_{ref}(x, y)$ can be generated by linearly combining values of all pixels within the first image ranges of the raw images on (2k+1) time indices according to corresponding weightings. The weighting $w_t(i,j)$ corresponding to the pixel coordinates $(i, j)$ on the time index t can be written as $$w_t(i, j) = \exp\left(\frac{-\|P_{ref}(x, y) - P_t(i, j)\|^2}{2\sigma^2}\right) \quad (2)$$

Here, $P_{ref}(x, y)$ is denoted as a second image range having a center coordinate $(x, y)$ of the raw image on the time index t=ref. $P_t(i, j)$ is denoted as a second image range having a center coordinate $(i, i)$ of the raw image on the time index t. In equation (2), the weighting $w_t(i,j)$ is determined according to differences between pixels of two second image ranges of the plurality of second image ranges. For example, in FIG. 5, the processor 13 can set a comparison reference as the second image range $P_{ref}(x, y)$ at t=ref. Then the processor can compare differences between pixels of the two second image ranges with different time indices and different positions. When similarity between the pixels of the two second image ranges is increased, the processor 13 can increase the weighting $w_t(i,j)$. When similarity between the pixels of the two second image ranges is decreased, the processor 13 can decrease the weighting $w_t(i,j)$. Further, the weightings can be calculated by any algorithm. Any reasonable technology of generating the weightings falls into the scope of the present invention.

As previously mentioned, in the super-resolution image reconstruction system 100, the reconstructed pixel of the super-resolution image can be generated by linearly combining the plurality of pixels of the raw images. Further, according to equation (1) and equation (2), for t=ref and the reconstructed pixel coordinates $(x, y)$ as a center point, when similarity of pixels of a plurality of raw images within a range is decreased, the weighting is decreased. When similarity of pixels of the plurality of raw images within a range is increased, the weighting is increased. In other words, in the super-resolution image reconstruction system 100, according to equation (1) and equation (2), the dominant terms of generating the reconstructed pixel of the super-resolution image correspond to pixels with high similarity. Therefore, the super-resolution image reconstruction system 100 has the following advantages. (a) The first image range and the second image range can be previously determined according to the version of the barcode image, the at least one finder pattern of the barcode image, and/or the comparison result of the barcode pattern with the look-up table or the formula. Thus, even if the size of the super-resolution image is changed, the first image range and the second image range can be dynamically adjusted, leading to computational complexity reduction. (b) Since motion vector information is introduced over time for dynamically adjusting the reconstructed pixel coordinates, the super-resolution image reconstruction system 100 can provide satisfactory image quality for generating the super-resolution image. (c) Since the super-resolution image reconstruction system 100 introduces pixel similarity for setting the weights, some extreme pixels (i.e., such as a pixel with a blur color tone or a pixel with a large motion offset) can be ignored. Therefore, the reliability of generating the super-resolution image can be increased.

Figure 6:
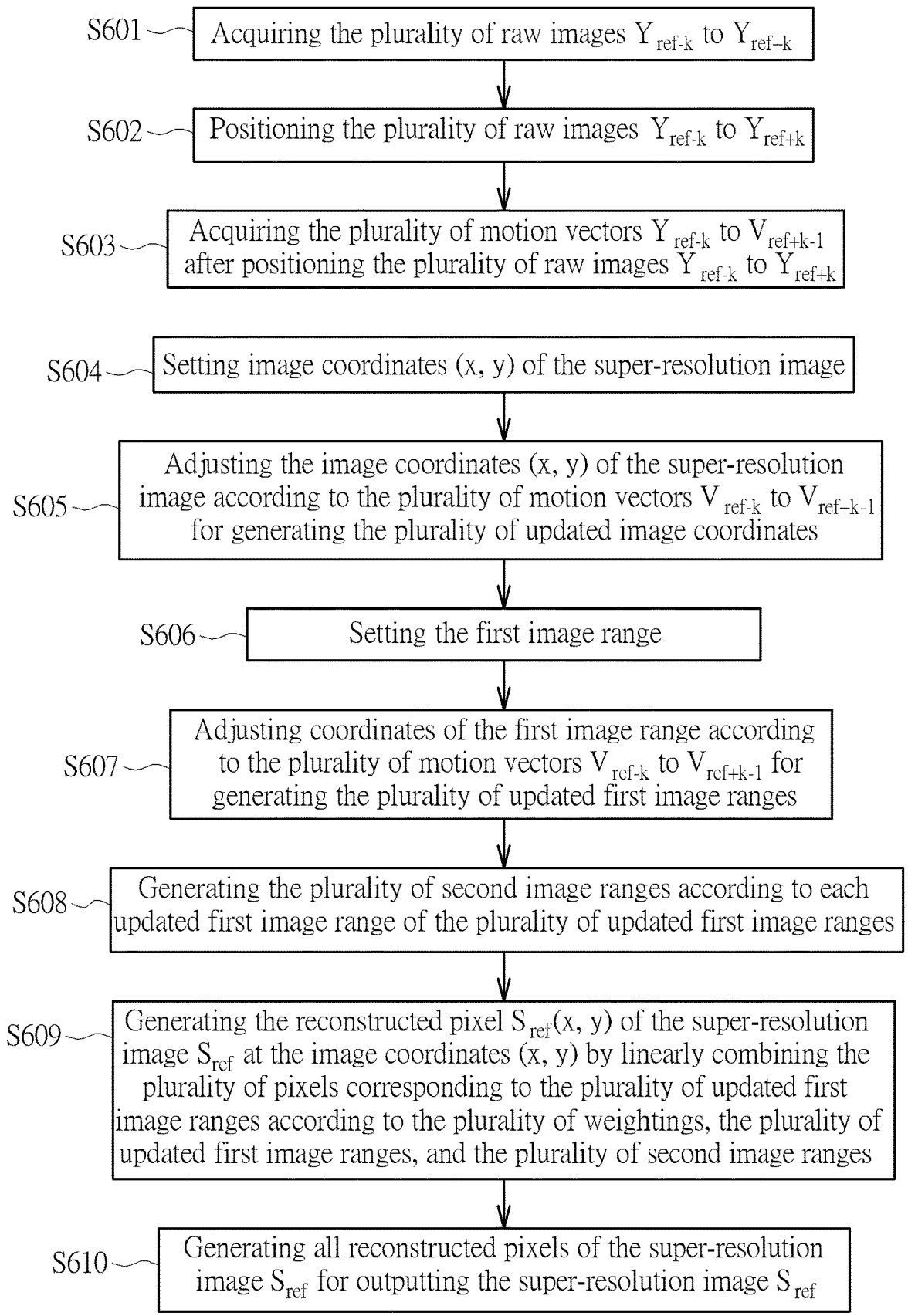
FIG. 6 is a flow chart of performing a super-resolution image reconstruction method by the super-resolution image reconstruction system in FIG. 1.

FIG. 6 is a flow chart of performing a super-resolution image reconstruction method by the super-resolution image reconstruction system 100. The super-resolution image reconstruction method includes step S601 to step S610. Any reasonable technology modification falls into the scope of the present invention. Step S601 to step S610 are illustrated below.

step S601: acquiring the plurality of raw images $Y_{ref-k}$ to $Y_{ref+k}$;

step S602: positioning the plurality of raw images $Y_{ref-k}$ to $Y_{ref+k}$;

step S603: acquiring the plurality of motion vectors $V_{ref-k}$ to $V_{ref+k-1}$ after positioning the plurality of raw images $Y_{ref-k}$ to $Y_{ref+k}$;

step S604: setting image coordinates $(x, y)$ of the super-resolution image;

step S605: adjusting the image coordinates $(x, y)$ of the super-resolution image according to the plurality of motion vectors $V_{ref-k}$ to $V_{ref+k-1}$ for generating the plurality of updated image coordinates;

step S606: setting the first image range;

step S607: adjusting coordinates of the first image range according to the plurality of motion vectors $V_{ref-k}$ to $V_{ref+k-1}$ for generating the plurality of updated first image ranges;

step S608: generating the plurality of second image ranges according to each updated first image range of the plurality of updated first image ranges;

step S609: generating the reconstructed pixel $S_{ref}(x, y)$ of the super-resolution image $S_{ref}$ at the image coordinates $(x, y)$ by linearly combining the plurality of pixels corresponding to the plurality of updated first image ranges according to the plurality of weightings, the plurality of updated first image ranges, and the plurality of second image ranges;

step S610: generating all reconstructed pixels of the super-resolution image $S_{ref}$ for outputting the super-resolution image $S_{ref}$.

Details of step S601 to step S610 are previously illustrated. Thus, they are omitted here. The super-resolution image reconstruction system 100 can generate the super-resolution image by using information of the plurality of raw images through step S601 to step S609. Further, the super-resolution image reconstruction system 100 can dynamically adjust the reconstructed pixel coordinates according to motion vectors $V_{ref-k}$ to $V_{ref+k-1}$ over time. Therefore, the super-resolution image reconstruction system 100 can provide satisfactory image quality for generating the super-resolution image.

To sum up, the present invention discloses a super-resolution image reconstruction method and a super-resolution image reconstruction system. The super-resolution image reconstruction system can use at least one first image range (Neighborhood Range) and at least one second image range (Patch Range) for generating super-resolution images according to a plurality of raw images with low computational complexity. Therefore, the super-resolution image reconstruction system has the following advantages: (a) The first image range and the second image range can be previously determined according to the version of the barcode image, the at least one finder pattern of the barcode image, and/or the comparison result of the barcode pattern with the look-up table or the formula. Thus, even if the size of the super-resolution image is changed, the first image range and the second image range can be dynamically adjusted, leading to computational complexity reduction. (b) Since motion vector information is introduced over time for dynamically adjusting the reconstructed pixel coordinates, the super-resolution image reconstruction system can provide satisfactory image quality for generating the super-resolution image. (c) Since the super-resolution image reconstruction system introduces pixel similarity for setting the weights, some extreme pixels (i.e., such as a pixel with a blur color tone or a pixel with a large motion offset) can be ignored. Therefore, the reliability of generating the super-resolution image can be increased.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A super-resolution image reconstruction method comprising:
   acquiring a plurality of two-dimensional barcode images;
   positioning finder patterns of the plurality of two-dimensional barcode images, wherein each two-dimensional barcode image comprises at least one finder pattern;
   acquiring a plurality of motion vectors for quantizing position offsets of the plurality of two-dimensional barcode images according to positions of the finder patterns after positioning the finder patterns of the plurality of two-dimensional barcode images;
   setting image coordinates of a super-resolution image;
   adjusting the image coordinates of the super-resolution image according to the plurality of motion vectors for generating a plurality of updated image coordinates;
   setting a first image range;
   adjusting coordinates of the first image range according to the plurality of motion vectors for generating a plurality of updated first image ranges;
   generating a plurality of second image ranges according to each updated first image range of the plurality of updated first image ranges;
   generating a reconstructed pixel of the super-resolution image at the image coordinates by linearly combining a plurality of pixels corresponding to the plurality of updated first image ranges according to a plurality of weightings, the plurality of updated first image ranges, and the plurality of second image ranges; and
   generating all reconstructed pixels of the super-resolution image for outputting the super-resolution image;
   wherein pixel coordinates of the each two-dimensional barcode image are denoted as (x, y), when a resolution of the first image range is N×M, the first image range corresponds to N×M second image ranges, and N and M are two positive integers.

2. The method of claim 1, wherein a size of the first image range and sizes of the plurality of second image ranges are determined by a version of a two-dimensional barcode image, the at least one finder pattern of the two-dimensional barcode image, and/or a comparison result of a barcode pattern with a look-up table or a formula.

3. The method of claim 1, wherein generating the plurality of second image ranges according to the each updated first image range of the plurality of updated first image ranges comprises:
   acquiring coordinates of N×M pixels of the each updated first image range;
   setting a size of a second image range; and
   generating N×M second image ranges to meet the size according to the coordinates of the N×M pixels of the each updated first image range;
   wherein a center of each second image range of the N×M second image ranges corresponds to coordinates of each pixel of the N×M pixels.

4. The method of claim 1, further comprising:
   setting the plurality of weightings;
   wherein a weighting of the plurality of weightings is determined according to differences between pixels of two second image ranges of the plurality of second image ranges, the weighting is increased when similarity between the pixels of the two second image ranges is increased, and the weighting is decreased when similarity between the pixels of the two second image ranges is decreased.

5. The method of claim 1, wherein the plurality of two-dimensional barcode images are generated by continuously capturing images of an object by an image capturing device over time, or generated by capturing images of the object by a plurality of image capturing devices.

6. The method of claim 1, wherein when the number of the plurality of two-dimensional barcode images is P and the number of the second image ranges corresponding to the each updated first image range is N×M, the reconstructed pixel of the super-resolution image at the image coordinates is relevant to weightings corresponding to P×N×M second image ranges.

7. The method of claim 1, wherein the first image range and the plurality of second image ranges are rectangles.

8. The method of claim 1, wherein the image coordinates of the super-resolution image are coordinates of a center point of the first image range, and the plurality of updated image coordinates correspond to coordinates of updated center points of the updated first image ranges.

9. The method of claim 1, wherein when the plurality of motion vectors are zero vectors, the plurality of updated image coordinates are the image coordinates of the super-resolution image, and the plurality of updated first image ranges are the first image range.

10. A super-resolution image reconstruction system comprising:
    an image capturing device configured to acquire a plurality of two-dimensional barcode images;
    a memory configured to save data;
    an output device configured to output a super-resolution image; and
    a processor coupled to the image capturing device, the memory, and the output device and configured to control the image capturing device, the memory, and the output device;
    wherein the image capturing device acquires the plurality of two-dimensional barcode images, the processor positions finder patterns of the plurality of two-dimensional barcode images, each two-dimensional barcode image comprises at least one finder pattern, pixel coordinates of the each two-dimensional barcode image are denoted as (x, y), the processor acquires a plurality of motion vectors for quantizing position offsets of the plurality of two-dimensional barcode images according to positions of the finder patterns after positioning the finder patterns of the plurality of two-dimensional barcode images, the processor sets image coordinates of the super-resolution image, the processor adjusts the image coordinates of the super-resolution image according to the plurality of motion vectors for generating a plurality of updated image coordinates, the processor sets a first image range, the processor adjusts coordinates of the first image range according to the plurality of motion vectors for generating a plurality of updated first image ranges, the processor generates a plurality of second image ranges according to each updated first image range of the plurality of updated first image ranges, the processor generates a reconstructed pixel of the super-resolution image at the image coordinates by linearly combining a plurality of pixels corresponding to the plurality of updated first image ranges according to a plurality of weightings, the plurality of updated first image ranges, and the plurality of second image ranges, the processor generates all reconstructed pixels of the super-resolution image, the processor controls the output device for outputting the super-resolution image, when a resolution of the first image range is N×M, the first image range corresponds to N×M second image ranges, and N and M are two positive integers.

11. The system of claim 10, wherein a size of the first image range and sizes of the plurality of second image ranges are determined by a version of a two-dimensional barcode image, the at least one finder pattern of the two-dimensional barcode image, and/or a comparison result of a barcode pattern with a look-up table or a formula.

12. The system of claim 10, wherein the processor acquires coordinates of N×M pixels of the each updated first image range, the processor sets a size of a second image range, the processor generates N×M second image ranges to meet the size according to the coordinates of the N×M pixels of the each updated first image range, and a center of each second image range of the N×M second image ranges corresponds to coordinates of each pixel of the N×M pixels.

13. The system of claim 10, wherein the processor sets the plurality of weightings, a weighting of the plurality of weightings is determined according to differences between pixels of two second image ranges of the plurality of second image ranges, the weighting is increased when similarity between the pixels of the two second image ranges is increased, and the weighting is decreased when similarity between the pixels of the two second image ranges is decreased.

14. The system of claim 10, wherein the plurality of two-dimensional barcode images are generated by continuously capturing images of an object by the image capturing device over time, or generated by capturing images of the object by a plurality of image capturing devices.

15. The system of claim 10, wherein when the number of the plurality of two-dimensional barcode images is P and the number of the second image ranges corresponding to the each updated first image range is N×M, the reconstructed pixel of the super-resolution image at the image coordinates is relevant to weightings corresponding to P×N×M second image ranges.

16. The system of claim 10, wherein the first image range and the plurality of second image ranges are rectangles.

17. The system of claim 10, wherein the image coordinates of the super-resolution image are coordinates of a center point of the first image range, and the plurality of updated image coordinates correspond to coordinates of updated center points of the updated first image ranges.

18. The system of claim 10, wherein when the plurality of motion vectors are zero vectors, the plurality of updated image coordinates are the image coordinates of the super-resolution image, and the plurality of updated first image ranges are the first image range.

* * * * *